United States Patent [19]

Braun et al.

[11] Patent Number: 4,621,319

[45] Date of Patent: Nov. 4, 1986

[54] PERSONAL DEVELOPMENT SYSTEM

[75] Inventors: Jerome M. Braun, Fremont, Calif.; David Chong, Beaverton, Oreg.; Darren Whittaker, Herndon, Va.

[73] Assignee: Intel Corporation, Santa Clara, Calif.

[21] Appl. No.: 424,729

[22] Filed: Sep. 27, 1982

[51] Int. Cl.[4] .............................................. G06F 15/16
[52] U.S. Cl. .................................... 364/200; 340/721
[58] Field of Search ........................................ 340/721; 364/200 MS File, 900 MS File

[56] References Cited

U.S. PATENT DOCUMENTS

| Re. 31,200 | 4/1983 | Sukonick et al. | 364/900 X |
| 4,204,206 | 5/1980 | Bakula et al. | 364/900 X |
| 4,486,827 | 12/1984 | Shima et al. | 364/200 |
| 4,495,594 | 1/1985 | Eggebrecht et al. | 364/900 |

OTHER PUBLICATIONS

Foster et al, "8080 Dynatrace", copyrighted 1976, reprinted in Programmer's Guide to CP/M, Edited by Sol Libes, pp. 146-154.

*Primary Examiner*—James R. Hoffman
*Attorney, Agent, or Firm*—Owen L. Lamb

[57] ABSTRACT

A microcomputer development system in which two jobs, such as a source program and an assembler program, can be run and monitored simultaneously. A CRT screen (10) is split so as to display information from both processor A (16) and processor B (18). A keyboard (12) is provided with a switch that toggles one of the processors so that the keyboard is assigned to that one processor to the exclusion of the other processor. In this case, the processor to which the keyboard is attached is designated the foreground processor, and its output is displayed highlighted on the CRT. The other processor is designated the background processor, and its information is displayed in reverse video to distinguish it from the foreground processor. At power-on reset time, processor A is designated the foreground processor and is assigned the keyboard. A printer (24) is always assigned to processor A. A disk controller (20) is shared by processor A and processor B, regardless of which processor is assigned to the keyboard. Information (flags) are passed back and forth between each processor and a CRT/keyboard controller (14) in order to provide information to control access to files on the floppy disk (22).

8 Claims, 9 Drawing Figures

PERSONAL DEVELOPMENT SYSTEM

BACKGROUND OF THE INVENTION

1. Field of the Invention

The present invention relates to data-processing systems, and more particularly, to an improved microcomputer-development system for use in the development and production of microcomputer-based products.

2. Description of the Prior Art

Microcomputer-development systems are design aids which facilitate microprocessor hardware and software development. The purpose of these development aids is to shorten the design cycle and thus save time and money in the development and production of microcomputer-based products. One such prior system is the Intel Model 230 Intellec Series II Microcomputer Development System. The system includes a CPU, RAM and ROM memories, a CRT, a keyboard, and diskette drives for on-line data storage. A diskette-operating-system software allows the apparatus to be used for assembling and/or compiling and debugging programs for various models of Intel's microprocessors.

In this and other prior development systems, it is necessary to do tasks serially. For example, if one is doing an assembly operation, one must wait until the operation is complete before going on to a different task. If one finds an error during assembly showing that there is a mistake in the source code, it is necessary to go back and reedit the source program. After the reediting is complete, it is necessary to go back to the assembly program and redo the assembly. Any further errors that are found in the assembly program require a repeat of the same serial procedure until there are no further errors and the final object program is done. The serial nature of the operations require that the source program be filed onto the disk and the asssembly program run until an error is found. Then the assembly program is loaded onto the disk and the source program is unloaded for editing. On the prior development systems, these operations must be done serially, because there is only one CPU on which either the source program or the assembly program can be run. One could use two separate development systems, and hence two CPUs. The editing could be done on one system and the assembly program run on the other system. Then when an error is found in the assembly program, the source program could be edited without the need to load and unload the various tasks. This would allow one to move on to another job while the assembly program is running on the second computer. The obvious drawback of this type of arrangement is the cost of having two complete development systems.

It is therefore an object of the present invention to provide a development system in which two tasks can be run in parallel and continuously monitored on the same system.

It is a further object of the present invention to provide a development system in which the keyboard, CRT, and input/output devices are shared by two processors which are capable of operating in parallel.

BRIEF SUMMARY OF THE INVENTION

Briefly, the above objects are accomplished in accordance with the invention by providing two processors which share the same CRT, keyboard, and floppy-disk drive. The CRT is shared by splitting the screen and the disk drive is shared by means of exchanging flags or semaphores. The flags provide a means of communication between the two processors such that one processor can indicate to the other processor that it needs to use the disk. In this manner, each processor is able to check the other processor to see if disk is being used or if disk is available. The disk will attach to only one processor at a time, but it is available to the other processor once it is free. A common controller is provided which stores the flags and parameters passed by each processor. When a processor wants to open a file for writing onto the disk, parameters are passed to the common controller and placed in a table. If the other processor tries to access the same file for other than reading, the flags in the table prevent that processor from doing so and destroying the information opened and written by the first processor.

In accordance with an aspect of the invention, only one processor is allowed to use the keyboard at a time. A function key on the keyboard toggles which processor is under keyboard control. This processor is then identified as the foreground processor, and the other processor is identified as the background processor.

In accordance with a further aspect of the invention, each processor has an output to the CRT. The screen on the CRT is split into two sections, and the lower section is dedicated to displaying information from the processor which is currently under keyboard control; that is, the foreground processor. The upper section of the screen is dedicated to displaying that information from the processor which is not under keyboard control; that is, the background processor.

In accordance with a still further aspect of the invention, the amount of screen used for one or the other processor can be dynamically changed even to the extent that none of a processor's display information is displayed. This is accomplished by storing an entire screenful (frame) for each processor in the CRT controller memory. Actuating a key on the keyboard increases the display size of one of the frames by a predetermined number of lines while decreasing the display size of the other frame by the same predetermined number of lines. In this manner the amount of information displayed simultaneously from the foreground processor and from the background processor may be varied under keyboard control.

The present invention has the advantage that two tasks may be run simultaneously on the same development system by sharing keyboard, CRT, and disk. The sharing of the CRT in a split-screen mode has the advantage that the user can passively monitor a background task that is running on one processor while actively interacting with a foreground task that is running on the other processor.

BRIEF DESCRIPTION OF THE DRAWINGS

The foregoing and other objects, features, and advantages of the invention will be apparent from the following detailed description of a preferred embodiment of the invention, as illustrated in the accompanying drawings, wherein.

DESCRIPTION OF THE INVENTION

Figure 1:
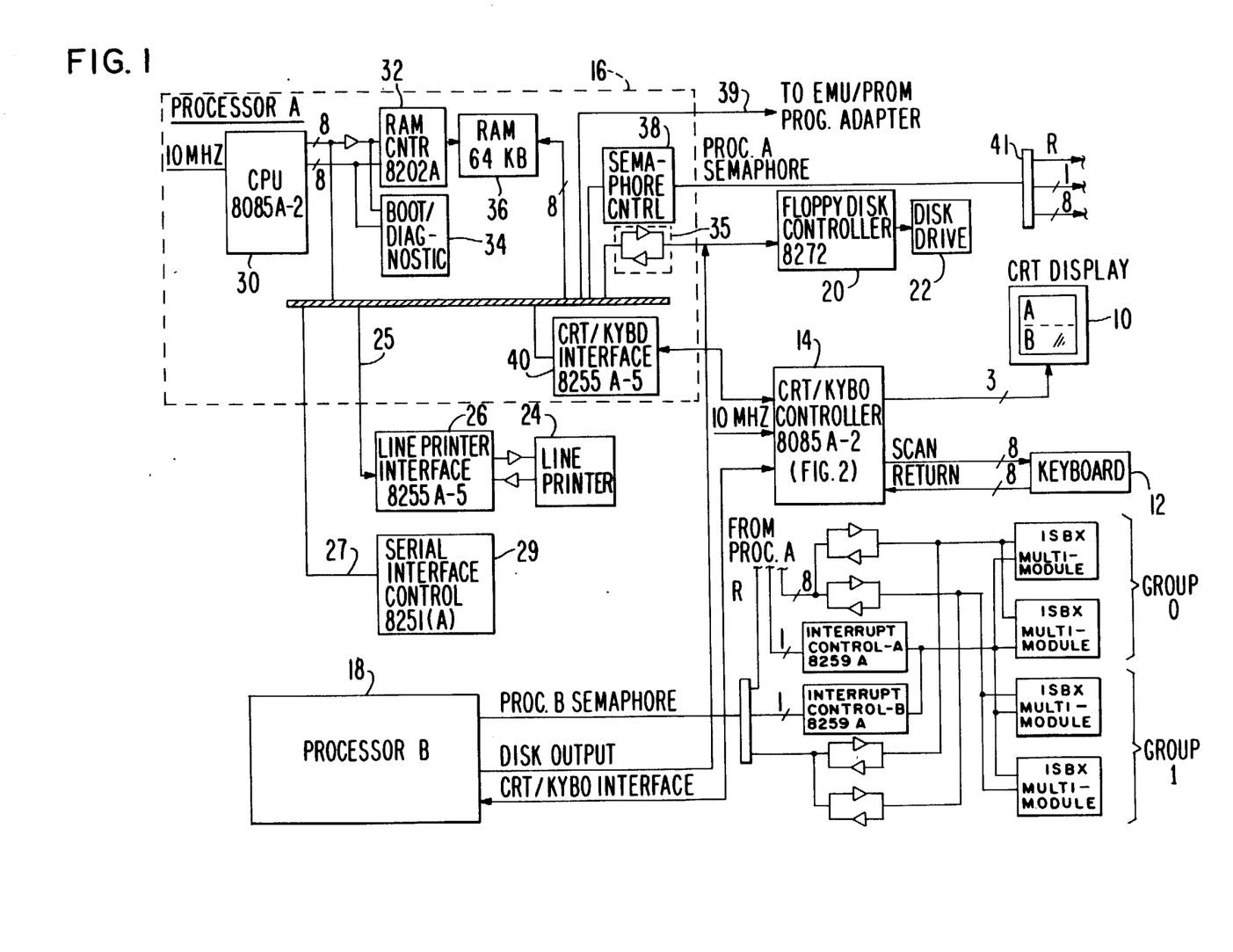
FIG. 1 is a functional block diagram of the invention as embodied in a microcomputer-development system.

Referring now to FIG. 1, the development system in which the invention is embodied will now be described. Where appropriate, reference is made within logic blocks to Intel components by number. These components are described in the Intel Component Data Catalog, which is available from Intel Corporation, 3065 Bowers Avenue, Santa Clara, Calif. U.S.A., 95051.

The development system comprises a CRT display (10) and keyboard (12), which are attached to a CRT/keyboard controller (14). The keyboard controller is shared by a first processor A (16) and a second processor B (18) which is identical to processor A. The two processors share a floppy disk (22) by means of a floppy disk controller (20). Processor A also attaches to a printer (24) by means of line printer interface (26).

As shown in FIG. 1, the CRT screen may be split so as to display information from both processor A and processor B. The keyboard (12) is provided with a number of switches. One of the switches will toggle a processor so that the keyboard is assigned to that processor to the exclusion of the other processor. In this case, the processor to which the keyboard is attached will be designated the foreground processor, and its information will be displayed highlighted on the CRT. The other processor is designated the background processor, and its information will be displayed in reverse video to distinguish it from the foreground processor. The printer (24) is always assigned to processor A. The disk (22) is shared by processor A and processor B, regardless of which processor is assigned to the keyboard. Information (flags) is passed back and forth between each processor and the controller (14) in order to provide information to control access to files on the floppy disk.

Processor A includes a CPU (30), a RAM controller (32) which controls a 64K RAM (36), a boot/diagnostic (34), a semaphore controller (38), and a CRT/keyboard controller (40). Processor B contains the same components within block (18). Processor A attaches to a line printer interface (26). Both processors are connected to a common-shared floppy controller (20) and a common-shared CRT/keyboard controller (14).

The CRT (10) is a nine-inch unit displaying 24 lines of 80 characters with a nominal 15.6 KHz horizontal-sweep rate. The interface to the unit is TTL compatible, direct-drive noncomposite video, and the only power requirement is +12 VDC.

The floppy disk interface controls up to four 5¼" double-sided 96 tpi floppy-disk drives such as Shugart model SA460. The floppy disk is a 5¼ inch, 96 tpi, two-headed unit. With a total of 80 tracks of sixteen 256-byte sectors per side, the formatted capacity of the unit is 640 KB (1K=1024). The interface is the industry standard with power requirements of +5 VDC and +12 VDC.

The Intel 8272 floppy-disk controller (20) is used in a non-DMA mode. A digital-data separator is used which locks in one bit time (4 us) and tolerates a maximum bit shift of ±750 ns. Refer to the Intel 8272 data sheet for programming details.

A disk ready (DRDY) is turned on by the MOTORON and the software must timeout for 400 ms before starting a disk read or write operation to ensure the drive is full speed. Software tests DRDY by reading I/O port C1H, shown below, and testing Bit 3.

0 = Disk Ready
1 = Disk Not Ready

The drive motor is turned on when RQFD-A(B) is detected for a floppy-disk operation and the motor will be kept turning as long as an operation is in progress. The MOTORON, however, will be turned off if there have been no disk commands for ten revolutions (2 seconds).

The Intel 8253 motor on timer is programmed in Mode 1.

The following I/O ports are used for three different semaphores handling the floppy disk and two groups (group 0 and group 1) of multimodule I/Os. All these semaphores are logically identical in operation, and for convenience, they are summarized here including multimodule semaphores. Software, described below with reference to FIG. 3, must use bit set/reset to prevent disturbing bits 3-7.

RQFD-A(B)/: Request for floppy disk when a zero is written.
RQM0-A(B)/: Request for Multimodule J1/J2 when a zero is written.
RQM1-A(B)/: Request for Multimodule J3/J4 when a zero is written.

Port C1H

RQFD-B(A)/: A zero indicates that the other processor is requesting access to the floppy disk or the disk is being used by the other processor.
RQM0-B(A)/: A zero indicates that the other processor is requesting access to the Multimodule J1/J2 or it is being used by the other processor.
RQM1B(A)/: A zero indicates that the other processor is requesting access to the Multimodule J3/J4 or it is being used by the other processor.

Note:
Suffixes shown are for Processor A. Use suffix in parenthesis for Processor B.

The third bit that is used in the semaphore is the bit 7 of the Interrupt Mask Status of the CPU. The 8085 Accumulator is loaded with the Interrupt Mask Status when an RIM instruction is executed. The bit 7, is the direct input from the serial input pin on the CPU and it is used here for the software to distinguish one processor from the other.

Data Port
Data Port I/O address: B0H–B1H. The following table shows I/O port assignments for data/status read and write ports:

| Port Address | RD | WR |
|---|---|---|
| B0H | Read Main Status Register | Reset 8272 Ready |
| B1H | Read from Data Register | Write Data/Command to Data Register |

A detailed description of the main status register command sequence and overall timing are listed in the Intel 8272 FDC data sheet.

Writing to port B0H will generate a Terminal Count (TC) signal to the 8272 Floppy Disk Controller (20). TC is used to terminate all disk read and write commands. If a TC is issued during a sector read, reading continues until the end of the present sector. If a TC is issued during a sector write, the remaining data field will be filled with zeros before CRC bytes are written.

All read/write operations use the disk interrupt to test the controller ready for next byte transfer. The disk interrupt is also used to test operation complete after a seek or recalibrate command. A sense interrupt command should follow to reset the interrupt (DINT). The present cylinder number may be verified if desired with this command.

The keyboard (12) is a typical typewriter array plus cursor control keys with all 61 keys and functions contained within an 8×8 switch matrix. Keystrokes are debounced and decoded in the controller. Also mounted on the keyboard is a system reset switch which resets the entire system.

The multimodule adaptor PWA and B-processor PWA attaches to the A-processor.

There are two cables, one from each processor, going to the multimodule adaptor PWA which allows the multimodule PWAs to be shared by the two processors.

There is another cable connecting the two processors which lets the processors communicate by semaphores and permits the processors access to the floppy disk, CRT and keyboard.

The EMV/PROM programmer module interface (39) permits connection of microcomputer emulation and EPROM programming hardware to the A-processor.

Up to four 8-bit Intel iSBX multimodule boards are supported through an intermediate board called the multimodule adaptor PWA (41) which provides four iSBX connectors.

The four iSBX multimodule connectors are divided into two groups of two connectors each. The two sets are shared by the two processor boards in a time-multiplexed fashion.

Processor A shown in FIG. 1 has the following memory and I/O capabilities:
64K bytes of RAM (36)
2K bytes of bootstrap in ROM (34)
Floppy disk interface (35)
CRT/keyboard interface (40)
Serial I/O port (29)
Line printer port (25)
Emulator/PROM programmer port (39)

Processor B connects to the processor A and shares the floppy disk, multimodules, and the CRT/keyboard terminal. Processor B is functionally identical to processor A except it does not have the integrated serial I/O and parallel printer I/O ports. If serial or parallel I/O capability is required, it can be added via multimodules.

The multimodules which mount on the multimodule adapter PWA are shared by the two processors.

CPUs

The processors in the system use Intel 8085A-2 processors. Refer to the Intel 8085 data sheet for description of the 8085 instruction set.

Clocks

The Intel 8085A-2 CPU takes a 10 MHz ±0.1% square wave at the clock input pin which makes the CPU run at 5 MHz operating frequency. The clock period of the CPU, $t_{cyc}$, is 200 ns, or:

$$T = t_{cyc} = 200 \text{ ns.}$$

Wait States

There will be one wait state inserted in each bus cycle regardless of any external wait request. This is to conform to the Intel peripheral ICs timing (8251A, 8255A-5, etc.).

There are two external wait requests that are AND'ed with the on-board wait signal IRDY.
MWAIT/Multimodule wait request from iSBX bus.

RDY/External ready from the emulator/PROM programmer port requesting wait state when pulled low.

Interrupts

RINT S/W Reset

This is the highest priority interrupt which is input to the CPU in processor A or B by the CRT/keyboard controller (14) upon receiving a special keystroke from the keyboard.

RINT is used to invoke a software (S/W) reset.

DINT (Disk Interrupt)

The second highest priority interrupt to the CPU in processor A or B is disk interrupt for the floppy disk controller (20).

KBINT (Keyboard Interrupt)

The KBINT may be used by software for the CRT/KYBRD data transfer if desired. It is activated for each character to be transferred to the CPU in Processor A or B.

MINTR (Multimodule Interrupt)

Each multimodule is assigned to have two interrupt lines per connector and there are total of eight multimode interrupts. These interrupts are encoded to one interrupt line on the adaptor board and brought to INTR pin of the CPU in processor A and B.

Memory

The maximum on-board RAM in processor A and B is 64K bytes fully addressable by 16 bits of address.

Boot 2K bytes of bootstrap program is stored in ROM in processor A and B and it is activated by the master reset. The program starts at the location 0 (on-board RAM is disabled) and it must be disabled upon exiting. The ROM is disabled by writing XXH to I/O port F0H.

Printer

The Printer Interface (26) is a Centronics-type parallel I/O with a minimum time of 200 us/character. The interface is implemented with an Intel 8255 programmable parallel interface IC. Refer to the Intel 8255 data sheet for programming details.

CRT/Keyboard Controller (14)

The CRT/keyboard controller (14) is the common interface between the user and the system. It is a subsystem that contains all of the basic requirements of a computer system (microprocessor, RAM, ROM, I/O). The CRT/keyboard controller performs three major functions: (1) it is responsible for displaying information from the system on the CRT; (2) it is responsible for transmitting information input by the user, via the keyboard, to which ever processor (A or B) is currently under keyboard control; and (3) it contains and updates information as to which files are open to the A or B processor, thereby providing communication between the two processors.

The CRT controller portion of the CRT/keyboard controller (14) takes care of updating the CRT refresh memory, converting ASCII characters into their displayable counterparts for the CRT, and providing the proper timing signals required by the CRT.

The CRT will respond to the same control characters which the Intel MDS Series II responds to, and ignore any others. The characters that will be recognized are:

| 1. | CONTROL G (0000111B) | BELL |
| 2. | CONTROL H (0001000B) | BACKSPACE |
| 3. | CONTROL J (0001010B) | LINE FEED |
| 4. | CONTROL M (0001101B) | CARRIAGE RETURN |
| 5. | CONTROL [ (0011011B) | ESCAPE |

The cursor location can be programmed in the same manner as the Intel Series II. These are implemented by outputting an ESC (1BH) followed by another ASCII character. These sequences are defined as follows.

| 1. | ESC,A | Move cursor up one line. |
| 2. | ESC,B | Move cursor down one line. |
| 3. | ESC,C | Move cursor to the right one character. |
| 4. | ESC,D | Move cursor to the left one character (if the cursor is at the left side, it goes up one line and to the right side). |
| 5. | ESC,E | Clears the screen, leaves the cursor where it is. |
| 6. | ESC,H | Home the cursor (in split screen mode, this will display from the beginning of refresh memory to the bottom of the available split screen). |
| 7. | ESC,J | Erase to the end of the screen. |
| 8. | ESC,K | Erase the current line. |
| 9. | ESC,G | Turn on graphics mode. |
| 10. | ESC,N | Turn off graphics mode. |
| 11. | ESC,Y, X Coord., Y Coord., offset = 20H Addressble cursor |

In each case, the cursor location will be relative to a full screen of display, which means the cursor can go off the screen in split-screen mode.

The two processors each have an output to the CRT. The screen is split into two sections, with the bottom section dedicated to displaying information from the processor which is currently under keyboard control (the foreground processor), and the upper section displaying that of the processor not under keyboard control (the background processor).

The user can dynamically change the amount of screen used for the foreground processor or the background processor. The background processor's display will be in reverse video nonhighlighted.

Even though the user can elect not to display any of a processor's display information, an entire screen full will be in CRT controller memory. This feature allows the user to change the size of a processor's display without losing any information (see SPECIAL KEYS section). Each system processor will think it has a full screen of 24 lines, 80 characters.

Figure 2:
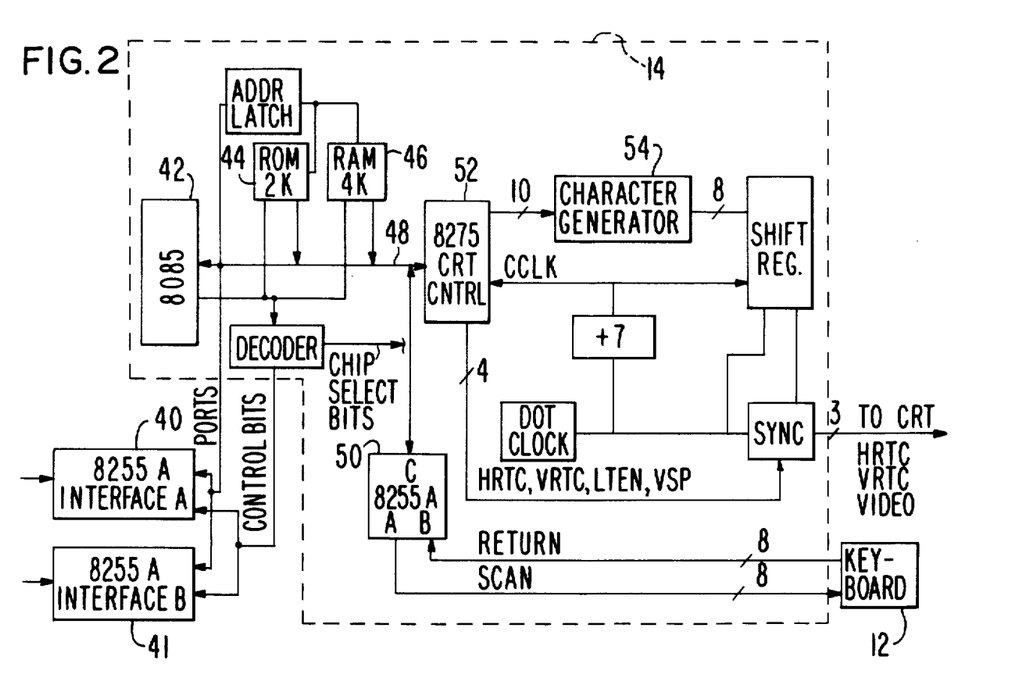
FIG. 2 is a block diagram of the CRT/keyboard controller shown in FIG. 1.

The keyboard controller (50) monitors the keyboard matrix via software for a keystroke. If the event occurs, debounce software is activated and the keystroke is decoded during the next vertical retrace cycle of the CRT (approximately 16 ms). The character ouput of the matrix is then examined and placed in one of the following categories:

| A. Single Character | |
| --- | --- |
| 1. Legal | Character is passed to PDS operating system (OS). |
| 2. Illegal | Character is ignored. |
| B. Double Character | |
| 1. Shift | Causes the second character to be presented to the OS in its uppercase form. |
| 2. Control | Causes the second character to be converted to its ASCII defined control character. |
| 3. Function | Causes a sequence of characters to be |

| | -continued |
|---|---|
| | presented to either the OS or the CRT keyboard processor in order to accomplish the task. |
| 4. Illegal | Characters are ignored, no overhead for either processor. |

All legal characters are passed to the foreground processor (processor to which the keyboard is assigned.)

| Special Keys | |
|---|---|
| Key | Meaning |
| Function, R | Sends a software interrupt to the foreground processor (processor under keyboard control). |
| Function, Home | Toggles which processor (A or B) is under keyboard control (foreground processor). |
| Function, Uparrow | Increases the display size of the bottom display (foreground processor) by one line while decreasing the top display by one line. |
| Function, Downarrow | Decreases the display size of the bottom display in split-screen by one line while increasing the top display size by one line. |
| Function, 0-9 | 10 user-defined functions which are passed to the foreground processor. |
| Function, T | Toggles the keyboard from between typewriter and nontypewriter mode. (Nontypewriter = caps lock) |

Referring to FIG. 2, the CRT/keyboard controller (14) shown in FIG. 1 will now be described in more detail. The CRT/keyboard controller is comprised of an Intel 8085 A-2 microprocessor (42). It has its own internal bus (48) buffered from the main processor bus by an Intel 8255A-5 (40), operated in mode 2. This allows the controller to run asynchronously with the main system. It has 2K bytes of control store ROM (44) and 4K bytes of RAM (46). The controller system closk is the same as that of the main processors A and B (10 MHz). The bus (48) from the CPU also attaches to an 8255A general-purpose controller (50) for controlling the keyboard (12). The bus (48) is also attached to an Intel 8275 controller (52) for controlling a character generator (54) which generates characters and synchronizes the CRT in a manner which is well-known in the art.

The various devices in the controller are accessed as memory locations. As little address decoding as possible is used, resulting in a very segmented and, for the large part, unused memory map. The Crt/keyboard controller memory map is shown below.

| MEMORY MAP FOR CRT/KEYBOARD CONTROLLER (Shaded blocks are not used) | | |
|---|---|---|
| 0000 | ROM | |
| 07FF | | |
| 1000 | RAM | |
| 1FFF | (Also at 9000-9FFF) | |
| 2000 | 8275 Parameters | |
| 2001 | 8275 Command | |
| 3000 | 8255A Port A | Keyboard Scan Output |
| 3001 | 8255A Port B | Keyboard Scan Input |
| 3002 | 8255A Port C | |
| 3003 | 8255A | |
| 4000 | STBA | Write Byte to Processor A |
| 5000 | STBB | Write Byte to Processor B |
| 6000 | ACKA | Read Byte from Processor A |
| 7000 | ACKB | Read Byte from Processor B |
| 9000 | RAM | |
| 9FFF | (Same ad at 1000-1FFF plus 8275 DMA ACK) | |

The Keyboard (12) is controlled by an Intel 8255A-5 (50) configured in Mode 0 with port A as the scan (output) and port B as the return (input). The upper portion of port C is used as a communication port to the processors A and B. The port addresses are shouw below:

| Port Addresses | | | |
|---|---|---|---|
| 3000H | Port A | PA0-PA7 | Keyboard Scan Output |
| 3001H | Port B | PB0-PB7 | Keyboard Scan Input |
| 3002H | Port C | PC0 | S/W Interrupt - Processor A (active high) |

-continued

| Port Addresses | | |
|---|---|---|
| | PC1 | S/W Interrupt - Processor B (active high) |
| | PC2 | Enables beeper (Active low) |
| | PC3 | CRT Diag LED (high = LED on) |
| | PC4 | Diagnostic video input |
| | PC5 | Diagnostic HRTC input |
| | PC6 | Diagnostic VRTC input |
| 3003H | Control Byte | |

An Intel 8275 CRT controller (52) is used for the actual generation of CRT signals. This device is normally used with a DMA controller. In accordance with the present invention, the use of such a controller is not necessary. This is accomplished by accessing refresh memory in two memory spaces (see CRT/keyboard memory map above). One space is for read/writes for processor use (1800H-1FFFH). The other space is an echo of the refresh memory which selects it for reads, but also selects the Intel 8275 for DMA acknowledge writes (9800H-98FFH). So a read from this memory space, after a DMA request from the 8275, will produce a DMA acknowledge and writes directly to the 8275.

The Intel 8085A-2 (42) is interrupt driven by the 8275 (52). The 8275 produces a DMA request (DRQ/) when it starts to display the current line of characters. The DRQ/ line is tied to the 8085's RST 6.5 interrupt pin. The 8275 also generates an interrupt request (IRQ) before it starts vertical retrace. Its IRQ is tied to the 7.5 interrupt line on the 8085. Since neither of these requests will occur at the same time, their priority is arbitrary.

The character generator (54) is a 2K×8-bit ROM device.

Communication to the processors A and B is through two Intel 8255A-5 intefaces (40, 41) programmed in Mode 2. (The 8255's bus interface is attached to processor A(B)'s bus and the 8255's Port A and C interface to the CRT/keyboard controller (14).) This mode provides the controller with one port for both input and output to the 8255. When the processor A has to output a byte to the 8255, the OBF (output buffer full) flag goes active low. This signal is tied to RST 6.5 of the CRT/keyboard processor which is disabled as an interrupt but is polled as an input line. The 8255's STB/ (strobe) and ACK (acknowledge) lines, which correspond to write/read lines respectively, are selected as memory locations (see CRT/keyboard memory map above).

In the dual processor arrangement of the present invention, the interface is duplicated with the input flag (OBF) of the processor B 8255 (41) tied to RST 5.5 of the controllers processor (42).

| I/O Port C0H | |
|---|---|
| | CRT/Keyboard data |
| I/O Port C1H | |

Because the 8085A-2 (42) is clocked at 10 MHz, and the fact that some of the peripherals attached to it are relatively slow devices, a multiple wait-state generator is necessary. This generator and its corresponding logic inject a one clock cycle wait state (200 ns) for any read or write operation, except for a strobe to either processor's 8255 when a two cycle wait state is used.

Software interrupts (see SPECIAL KEYS section) for the A and B processors are also available but are decoded by the controller as any other key depression and sent to the processor via port C of the keyboard 8255 (50).

| CRT/Keyboard Controller I/O Signals | |
|---|---|
| Signal Name | Description |
| OBF-A/ | Output buffer full from the A processor. This signal is set when the A processor writes into its output buffer and cleared when the controller reads from it. It is the PC7 output of the A processor's 8255 (I/O Port C2H) and is connected to RST5.5 of the controller's 8085. |
| OBF-B/ | Same as OBF-A, except from the B processor and it is connected to the SID input of the controller's 8085 (42). |
| ACK-A/ | Acknowledge (active low). A low on this enables the A processors buffer contents onto the controllers bus and clears the OBF-A/. Activated by reading from location 6000H. |
| ACK-B/ | Same as ACK-A/ except for the B processor and activated by reading from location 7000H. |
| STB-A/ | Strobe. A low on this writes the controller's bus into the A processor's input buffer. Activated by writing to location 4000H. |
| STB-B/ | Same as STBA/ except for the B processor and activated by writing to location 5000H. |
| RINT-A | Software interrupt to processor A. Tied from bit 0 of port C on the keyboard 8255 (50) to the RST 7.5 pin on the A processor. |
| RINT-B | Software interrupt for processor B. Tied from bit 1 of port C on the keyboard 8255 (50) to the RST 7.5 pin on the B processor. |
| HRTC | Horizontal retrace signal to the CRT. |
| VRTC | Vertical retrace signal to the CRT. |
| VIDEO | Video out signal to the CRT. |

CRT/KEYBOARD CONTROLLER MICROCODE

The CRT/keyboard controller microcode is resident in 2K bytes of PROM (44) dedicated for controller use. It consists of the execution code necessary for operation, and a keyboard decode table.

Refer to FIGS. 5-10 for detailed CRT/keyboard controller microcode flowcharts. The microcode initializes the 8275 CRT controller (block 100) and the 8255 keyboard controller (block 102). Next it sends 55H to processors A and B (block 104) and puts an "A" in that portion of the display screen dedicated to processor A (block 106), and puts a "B" in that portion of the display screen dedicated to processor B (block 108). The flow proceeds to scan the input from the processor A (block 110), the processor B (block 114), and the keyboard (block 118) for a character. Depending upon which, if any, of these input have a character, the flow proceeds to either FIGS. 6, 7, or 8.

The CRT controller (52) interrupts the controller processor (42) whenever it needs service. The keyboard is scanned (block 118) after each frame interrupt (the interrupt caused by CRT vertical retrace). The rest of the time, in between interrupts, is spent polling the input flags (OBF) from the two processors (A and B), looking for input (blocks 110, 114), updating screen refresh memory, and executing controller commands received either from the keyboard or from one of the processors, A or B.

Processor/Controller Communication

Inputs from the processors (blocks 110, 114) are discovered by polling the SID (processor B) and restart 5.5 (processor A) which are tied to the output buffer full flags (OBF) on the 8255(s) (40, 41) which are the output ports from the processors A and B.

Figure 5:
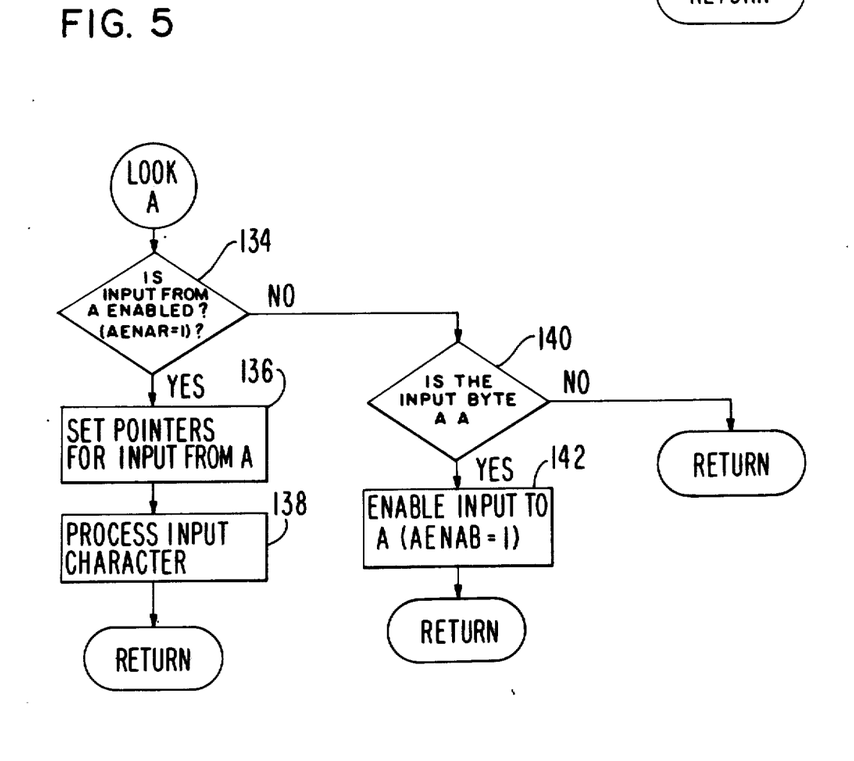
Figure 6:
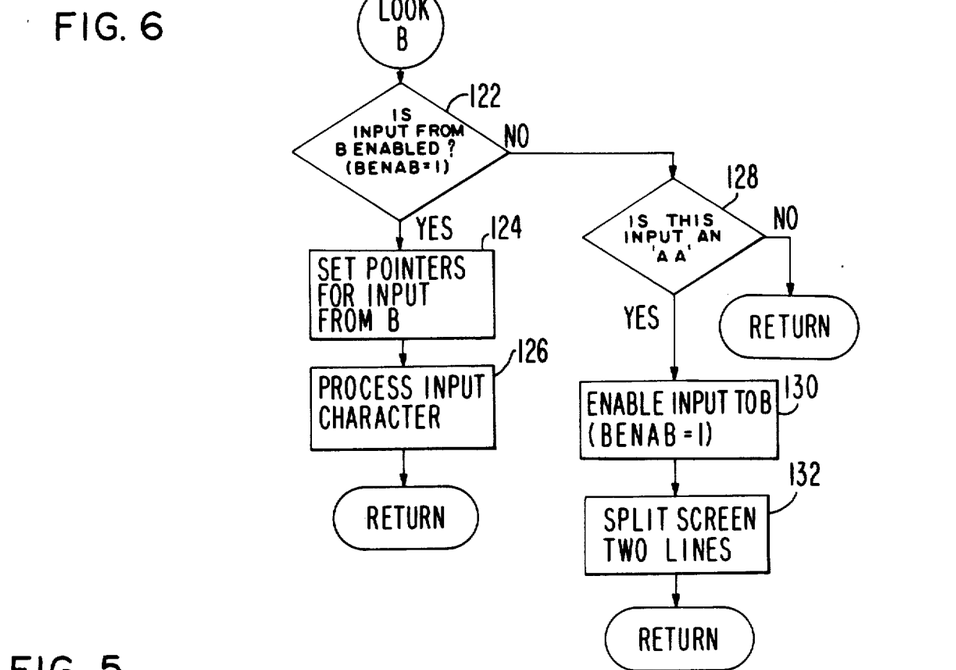

When a character is output from a processor to the controller, the microcode processes the input character (block 126, FIG. 6 or block 138, FIG. 5). The character can be one of four kinds:

1. A standard printable ASCII character which is then stored at the current cursor location.

2. A standard nonprintable ASCII character which will modify the display.

3. An ESC (escape), which will be followed by another character to define an escape sequence for screen control.

4. A dual processor communication character.

In any of the three character cases, the type of the character must first be established, and then the appropriate action taken.

Figure 7:
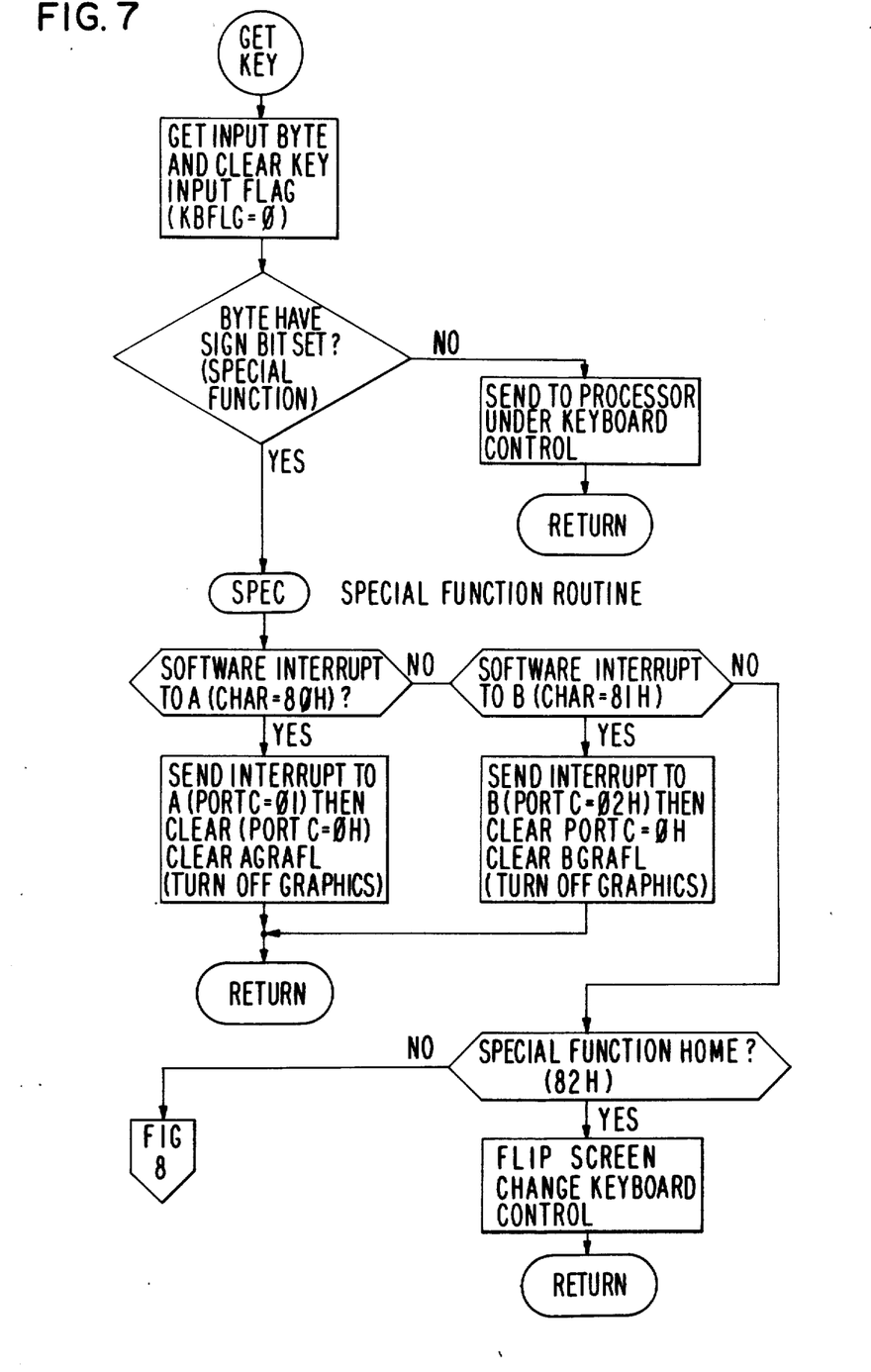
Figure 8:
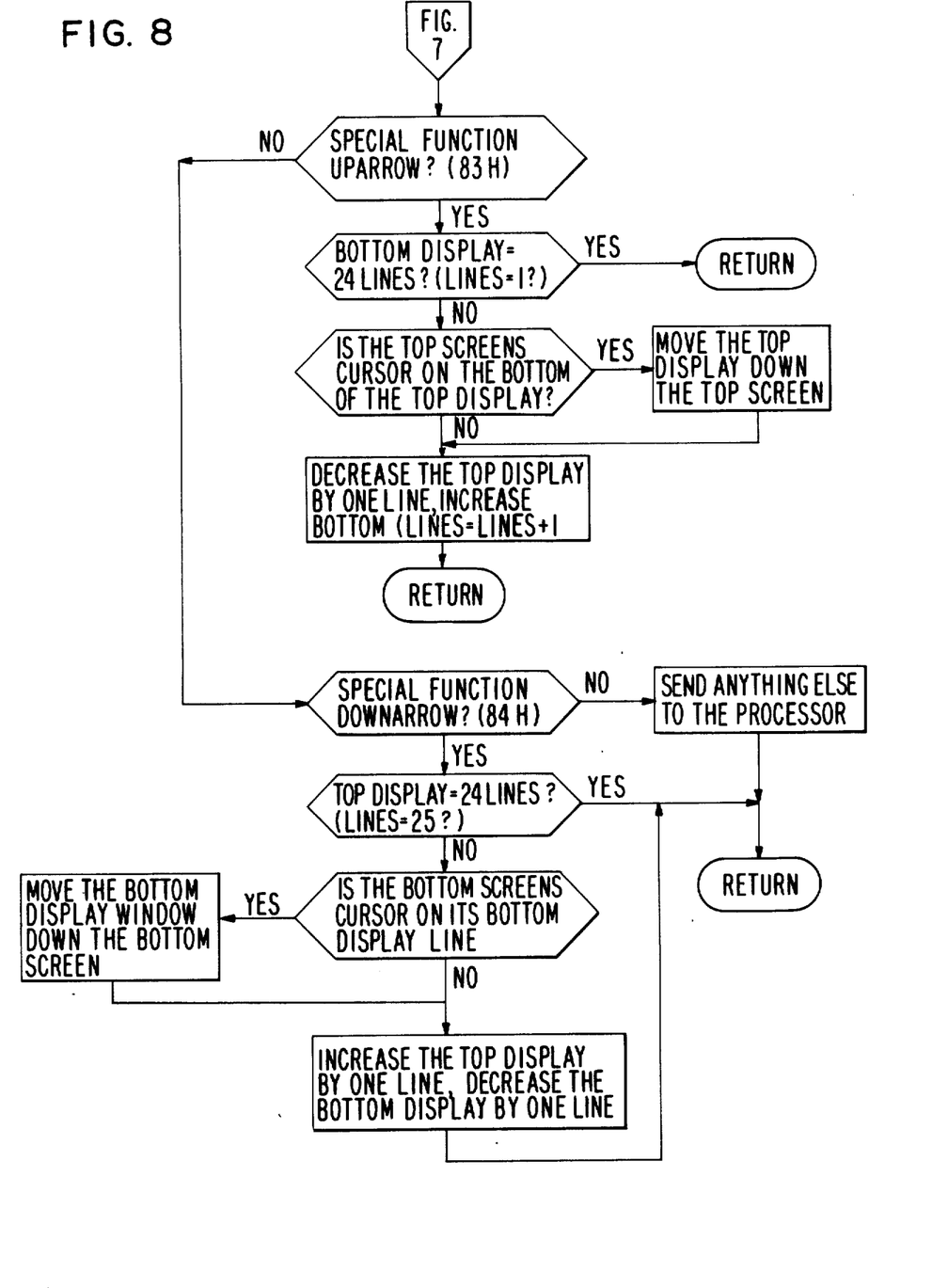

A keyboard scan routine, FIGS. 7–8, is executed every vertical retrace cycle (approximately 16 ms) at which time the following occurs.

If the scan routine determines that a key has been depressed (block 118, FIG. 4) and a different character was saved during the previous scan cycle, then a debounce routine will save the new character(s) and exit. If three or more keys are depressed, an error condition exists and the debounce routine ignores the keystrokes and exits.

Figure 4:
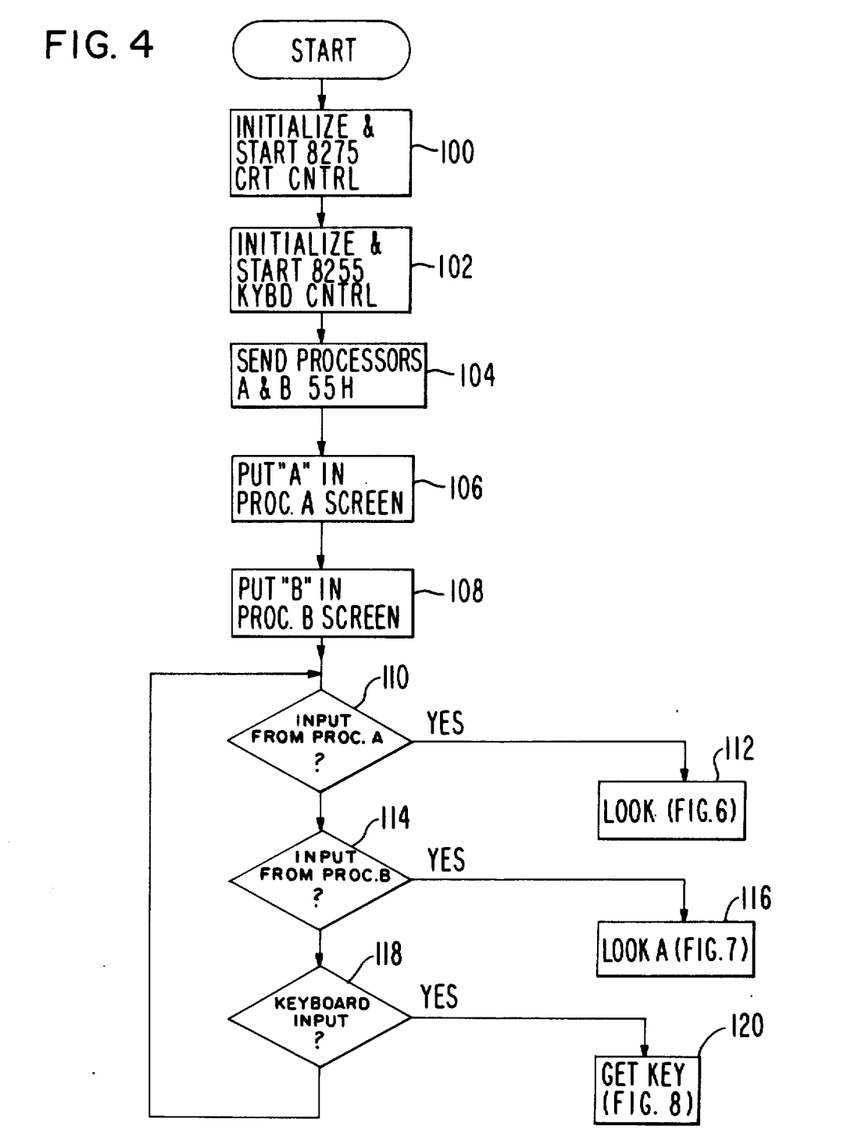
FIGS. 4-8 comprise a flowchart of the microcode in the CRT/keyboard controller of FIG. 2 for implementing split-screen operation on the CRT; and, FIG. 9 is a flowchart of the microcode in the CRT/keyboard controller of FIG. 2 for implementing a file command operation to floppy disk.

If the scan routine determines that a keystroke has occurred, and the key(s) stored during the previous debounce cycle compare with the key(s) from the present scan cycle, a decode routine is called. It performs a table look-up in the keyboard decode table in order to obtain the proper ASCII or special character. It then passes this information to the communications routine for distribution to either the operating system of the processor A or B to which the keyboard has been assigned or the CRT routine. If the same key(s) has been depressed for a 1.0 second delay an auto-repeat cycle will begin at a rate of 15 cps.

Figure 3:
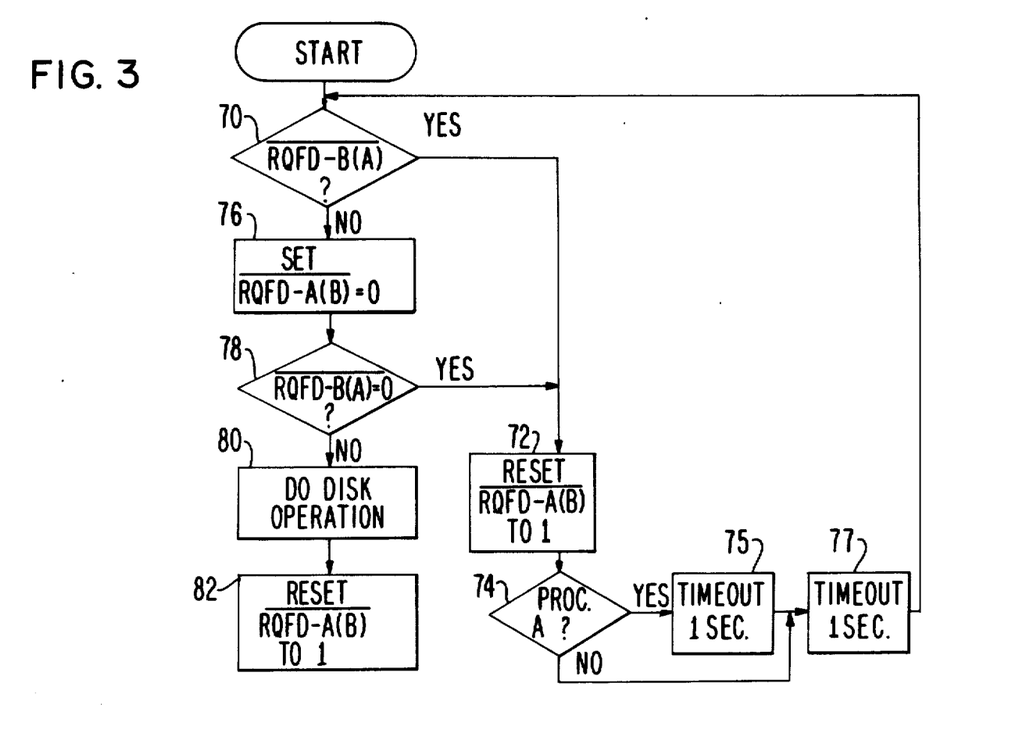
FIG. 3 is a flowchart of the logic necessary to resolve concurrent requests for floppy disk.

Referring to FIG. 3, the disk-sharing semaphores will now be described. Since there are three different I/O resources, there are three flags which are exchanged between the two processors:
RQFD—Request for floppy disk.
RQM0—Request for multimodule group zero.
RQM1—Request for multimodule group one.

Port C2H and Port C1H, shown above, are provided for receiving the parameters. If the two processors request the floppy disk at the same time, the conflict must be resolved. Conflicts between the two processors are resolved in the software as shown by the flow chart of FIG. 3. For example, assume processor A requests use of the floppy disk. The first step (70) is to test RQFD. If the B processor has requested the floppy disk, this will cause a yes output. The A processor will then reset its RQFD bit (block 72) and will go into a timeout (74, 75, 77) which is longer for the A processor (2 seconds) than it is for the B processor (1 second). If the test in block (70) indicated no, then the A processor sets its bit to zero (block 76) and then tests the RQFD bit for processor B again (block 78) to be sure that it had not been set in the interim. If the result is no, then processor A can do the disk operation (block 80) and at its completion it can reset the RQFD bit (block 82), making the disk available for processor B. If the B processor had requested the floppy disk in the interim, this will cause a yes output from block (78). The A processor will then reset its RQFD bit (block 72) and will go into the timeout (74).

The software flow is identical for both processors with the exception that the timeout for the A processor is one second, whereas the timeout for the B processor is two seconds. The reason for this is that if two processors arrive at the same time requesting the disk and they both have the same timeout, their operation will be in lockstep and neither one of them will be given access. The difference in time delay grants access to processor A, the processor with the shorter timeout, and break the deadlock. Bit 7 is a direct input from the serial input pin on the CPU, and it is used by the software to distinguish one processor from the other. This bit is also used during power-up to ensure that the A processor, during the boot operation (FIG. 4), becomes the foreground processor and comes up on the screen first.

Processor A/Processor B Communication

To provide the user with disk-file protection between the two processors, the information as to which files each processor has open is kept in the CRT/keyboard controller memory (46). This provides a small section of RAM accessible, indirectly, from both processors A and B. The flowchart of FIG. 9, described below, illustrates the action taken when the type of character, of the four types discussed above, is the dual processor communication character FILECH.

Figure 9:
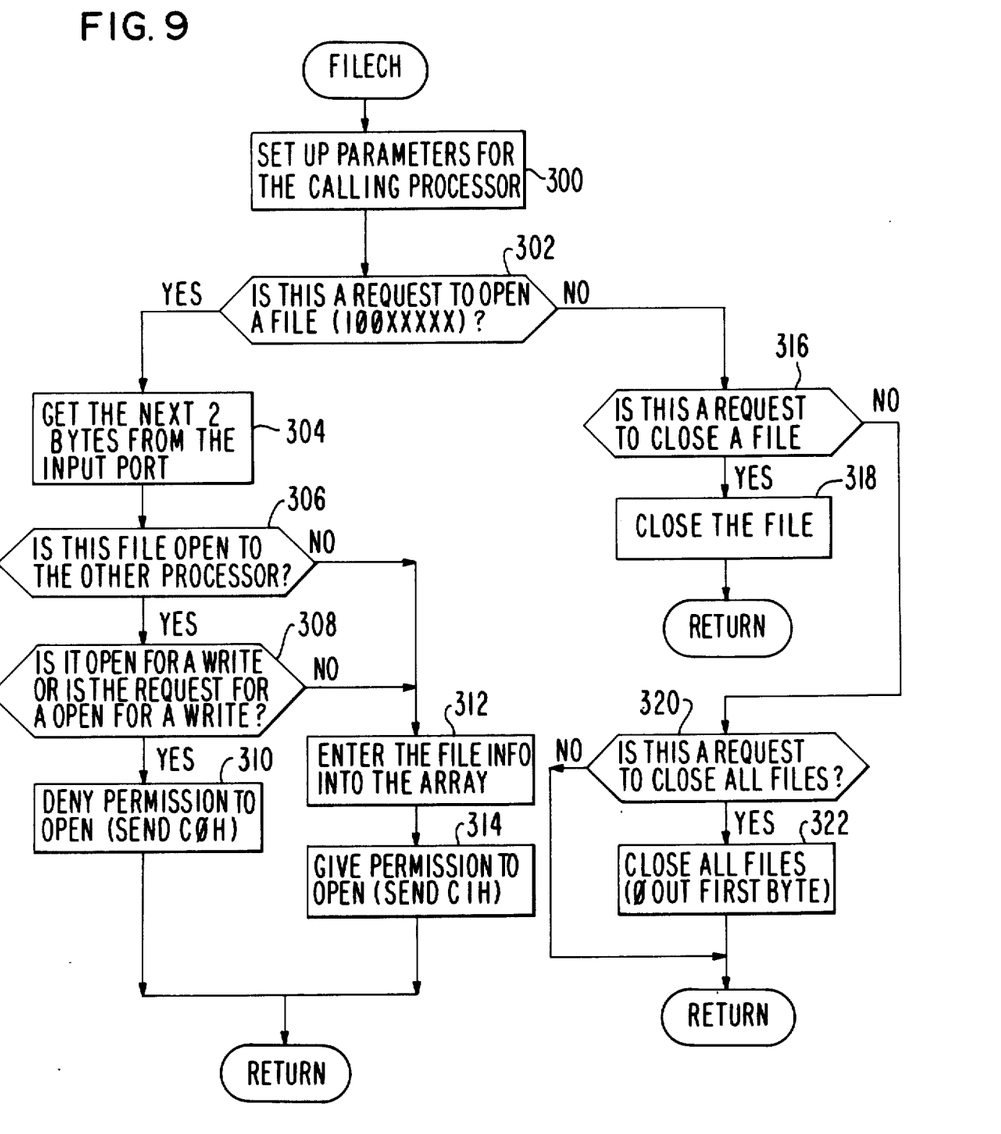

Refer to FIG. 9. When a processor wishes to open a file (a yes decision out of block 302), it transmits the file information to the controller (block 304). In the case of a processor wishing to open a file for a write operation (block 308), if that file is not already open to the other processor (a no decision out of block 306), the controller adds the file identifier and disk number to the array of files open to the requesting processor (block 312), then informs that processor that it is free to open the file in question (block 314). If the file is already open to the other processor (a yes decision out of block 306), the requesting processor is informed that the file it wishes is in use (block 310). This will ensure that only one processor has access to a given file for a write at a time.

In the case of a processor requested a file open for a read, if that file is not already open to the other processor for a write (a no decision out of block 308), permission to open is granted, and the file information is added to the array of open files (blocks 312, 314).

When a processor wishes to close a file or all files (a no decision out of block 302), the flow proceeds down the right hand-path (blocks 316–322).

The requesting processor supplies the index which points where, in that processor's open file array in controller memory, to store the file information. The following table describes the vocabulary between the controller and the processors to perform the above-described functions.

| Processor-CRT/Keyboard Controller Control Commands | |
|---|---|
| Control Byte | Meaning |
| *Processor To Controller* | |
| 1000PPPP WR0000NN ZZZZZZZZ | Request file open. WR indicates whether write or read. Requires three bytes. |
| 1100PPPP | Request file closed. |
| 1110XXXX | Close all files. Close all files currently open to requesting processor. |
| | W = 1 Indicates a write operation |
| | R = 1 Indicates a read operation |
| | PPPP = Array offset file number |
| | NN = disk number |
| | ZZZZZZZZ = File number identifier |
| | X = Don't care |
| *Controller to Processor* | |
| 11000001 | Permission to open. The file is available and is now allocated to the requesting processor. |
| 11000000 | No open. The requested file is in use, permission to open denied. |
| 1011YYYY | User-defined special functions (0–9). |
| | YYYY = User-defined function number (0–9). |

While the invention has been particularly shown and described with reference to a preferred embodiment thereof, it will be understood by those skilled in the art that the foregoing and other changes in form and detail may be made therein without departing from the spirit and scope of the invention.

What is claimed:

1. A microprocessor-development system comprising:
   a display means;
   a keyboard;
   a first processor;
   a second processor;
   a CRT/keyboard controller connected to said first processor, said second processor, said display means, and said keyboard, said controller including:
   first means for storing a full-display frame from said first processor;
   second means for storing a full-display frame from said second processor;
   third means connected to said first and second means, for causing to be displayed, simultaneously on said display means, a first frame which is part of said first full-display frame from said first processor and a second frame which is part of said second full-display frame from said second processor;
   fourth means responsive to actuation of said keyboard, for selectively designating one of said processors as a foreground processor and the other of said processors as a background processor said fourth means further including logic means for maintaining information as to which files each of said first and second processors has open, to thereby facilitate processor-to-processor communication; and,
   fifth means connected to said fourth means for transmitting information inputted via said keyboard to said one of said processors designated by said fourth means as said foreground processor to the exclusion of said other processor designated as said background processor;
   whereby a task running on said background processor is visible to an operator, enabling said operator to manipulate a task running on said foreground processor by means of said keyboard assigned to said foreground processor while simultaneously monitoring a task running on said background processor.

2. The combination in accordance with claim 1 wherein:
   said third means includes means responsive to said fourth means for displaying indicia identifying at least one of said first frame or said second frame as associated with said foreground or said background processor as so designated by said fourth means;
   whereby tasks running on said foreground and background processors are identifiable to an operator.

3. The combination in accordance with claim 1 or claim 2 wherein:
   said third means for causing to be displayed simultaneously on said display means, part of said first frame and part of said second frame, includes means for displaying one of said frames in video and the other of said frames in reverse video.

4. The combination in accordance with claim 1 or claim 2, wherein said fourth means includes means responsive to power-on reset for designating said first processor as the foreground processor so that said first processor is always assigned to said keyboard at power-on reset time.

5. The combination in accordance with claim 1 or claim 2, wherein said fourth means further comprises:

means responsive to further actuation of said keyboard, for selectively increasing the display size of one of said first or second frames by a predetermined number of lines while decreasing the display size of the other frame by said predetermined number of lines;

whereby the amount of information displayed simultaneously from said foreground processor and from said background processor may be varied under keyboard control.

6. The combination in accordance with claim 1 or claim 2, further comprising:

a disk-storage means;

a disk controller connected to said first processor, to said second processor, and to said disk storage means; and wherein said fourth means includes:

(1) decoding means for decoding characters input from said first processor, said second processor, and said keyboard, said decoding means including means for distinguishing a dual processor communication character sent from one of said processors requesting access to a file stored on said disk storage means, said dual processor communication character indicating, selectively, that a file is to be opened for said one processor for a write or a read operation, (2) sixth means for maintaining an array of files open to each of said first and second processors;

(3) seventh means including in said maintaining means, responsive to said decoding means, operative upon the condition that, in the case of said decoded character indicates that a file is to be opened for said one processor for a write operation, and upon the condition that said file is not already open to the other processor, for causing said sixth means to add a file identifier and a disk number to the array of files open to said one processor, and for informing said one processor that it is free to open said file and, (4) eighth means included in said maintaining means, responsive to said decoding means, operative upon the condition that, in the case of said decoded character indicates that a file is to be opened for said one processor for a write operation, and upon the condition that said file is already open to said other processor, for informing said one processor that said file is in use, to thereby ensure that only one processor has access to a given file for a write at a time, and, (5) ninth means included in said maintaining means, responsive to said decoding means, operative upon the condition that, in the case of said decoded character indicates that a file is to be opened for said one processor for a read operation, if that file is not already open to said other processor for a write, for causing said sixth means to add a file identifier and a disk number to the array of files open to said one processor, and for informing said one processor that it is free to open said file; and, (6) tenth means connected to said first processor, to said second processor, to said fourth means, and to said disk controller, responsive to said fourth means, for operatively connecting said disk controller to said one of said processors requesting access to a file stored on said disk storage means to the exclusion of said other processor;

whereby said disk controller is shared by processor A and processor B, regardless of which processor is assigned to said keyboard.

7. A microprocessor-development system comprising:

a display means;

a keyboard;

a first processor;

a second processor;

a disk-storage means;

a disk controller connected to said first processor, to said second processor, and to said disk storage means;

first means connected to said first processor for storing a full-display frame from said first processor;

second means connected to said second processor for storing a full-display frame from said second processor;

third means connected to said display means, responsive to said first and second means, for causing to be displayed, simultaneously on said display means, a first frame which is part of said first full-display frame from said first processor and a second frame which is part of said second full-display frame from said second processor; and, fourth means connected to said keyboard, and responsive to actuation of said keyboard, for selectively designating one of said processors as a foreground processor and the other of said processors as a background processor, said fourth means including:

(1) decoding means for decoding characters input from said first processor, said second processor, and said keyboard, said decoding means including means for distinguishing a dual processor communication character sent from one of said processors requesting access to a file stored on said disk storage means, said dual procesor communication character indicating, selectively, that a file is to be opened for said one processor for a write or a read operation, (2) sixth means for maintaining an array of files open to each of said first and second processors;

(3) seventh means included in said maintaining means, responsive to said decoding means, operative upon the condition that, in the case of said decoded character indicates that a file is to be opened for said one processor for a write operation, and upon the condition that said file is not already open to the other processor, for causing said sixth means to add a file identifier and a disk number to the array of files open to said one processor, and for informing said one processor that it is free to open said file and, (4) eighth means included in said maintaining means, responsive to said decoding means, operative upon the condition that, in the case of said decoded character indicates that a file is to be opened for said one processor for a write operation, and upon the condition that said file is already open to said other processor, for informing said one processor that said file is in use, to thereby ensure that only one processor has access to a given file for a write at a time, and, (5) ninth means included in said maintaining means, responsive to said decoding means, operative upon the condition that, in the case of said decoded character indicates that a file is to be opened for said one processor for a read operation, if that file is not already open to said other processor for a write, for causing said sixth means to add a file identifier and a disk number to the array of files open to said one processor, and for informing said one processor that it is free to open said file; and, (6) tenth means connected to said first processor, to said second processor, to said fourth means, and to said disk controller, responsive to said fourth means, for operatively connecting said disk controller to said one of said processors requesting access to a file stored on said disk storage means to the exclusion of said other processor;

whereby said disk controller is shared by processor A and processor B, regardless of which processor is assigned to said keyboard.

8. The combination in accordance with claim 7 further comprising:

fifth means connected to said first processor, to said second processor, to said fourth means, and to said keyboard, responsive to said fourth means, for operatively connecting said keyboard to said one of said processors designated by said fourth means as said foreground processor to the exclusion of said other processor designated as said background processor.

* * * * *